United States Patent [19]
Dauchez

[11] Patent Number: 5,199,552
[45] Date of Patent: Apr. 6, 1993

[54] ENDLESS BELT CONVEYOR

[75] Inventor: Gilbert Dauchez, Blanc Mesnil, France

[73] Assignee: FCB, Montreuil, France

[21] Appl. No.: 895,330

[22] Filed: Jun. 8, 1992

[30] Foreign Application Priority Data
Jun. 10, 1991 [FR] France ................... 91 07040

[51] Int. Cl.⁵ ............................................. B65G 23/06
[52] U.S. Cl. ..................................... 198/834; 474/158
[58] Field of Search ............... 198/834; 474/158–160, 474/164

[56] References Cited
U.S. PATENT DOCUMENTS
2,137,037  11/1938  Terry ................................... 424/158
3,518,940   7/1970  Stroud et al. .
4,538,516   9/1986  Aaron ................................. 198/834

Primary Examiner—Joseph E. Valenza
Attorney, Agent, or Firm—Collard & Roe

[57] ABSTRACT

Endless belt conveyor in which the belt is stretched between two pulleys or drums one of which is a drive pulley provided, at least at one of its ends, with belt guiding devices consisting of a circular row of studs fitting into holes punched on the belt edge. To make is possible to use holes-and-studs guiding devices on a thin belt without any risk of the belt tearing, the studs are fastened on a ring mounted on the drive pulley shaft, coaxially therewith, so as to rotate on the shaft.

5 Claims, 2 Drawing Sheets

ENDLESS BELT CONVEYOR

BACKGROUND OF THE INVENTION

1. Field of the Invention

This invention relates to endless belt conveyors the belt of which is stretched between two pulleys or drums one of which is a drive pulley provided with belt guiding means at least at one of the belt ends.

2. Description of the Prior Art

The invention relates more particularly to conveyors of the type disclosed in U.S. Pat. No. 3,518,940 and equipped with a very thin belt having a thickness in the range of 1/10th of a millimeter. Such conveyors are used, in particular, in high intensity magnetic separators intended for separating materials of weak magnetic susceptibility and including a roll consisting of a set of disc-shaped pole pieces and permanent magnets mounted alternately on a shaft, which roll constitutes the conveyor drive pulley. In these machines, the belt is used, on the one hand, to convey the material to be separated on the roll and to remove the magnetic particles, and, on the other hand, to protect the roll against clogging up and abrasion. The belt must be made of a non-magnetic material and it must be as thin as possible in order not to affect significantly the roll performance.

In order to prevent the belt from driving transversely, it is necessary to guide it at one of its ends or at both of them. Accordingly, it has been proposed to provide at least one of the drive pulley ends with a circular row of studs fitting into holes punched along the edge of the belt. This cannot be done without precautions in conveyors equipped with a very thin belt for the following reasons: because of manufacturing tolerances and of the belt stretch under tension, there are necessarily differences between the distance between the studs and the distance between the belt holes so that, after a certain time of operation, the studs and the holes are no longer coincident with each other, and the former exert on the edges of the holes forces which tend to slide the belt on the pulley and which would result in tearing a very thin belt.

SUMMARY OF THE INVENTION

The object of the present invention is to eliminate this risk and to make it possible to fit a thin-belt conveyor with holes-and-studs type guiding means for driving the belt.

In an endless belt conveyor in which the belt is stretched between two pulleys one of which is a drive pulley equipped at at least one of its ends with belt guiding means consisting of a circular row of studs fitting into holes defined along a belt edge registering with the row of studs, the above and other objects are accomplished according to the invention with a freewheel comprising an outer ring and an inner ring, the studs being affixed to the outer ring and the inner ring being fastened to the drive pulley shaft, the outer ring of the freewheel being mounted on the inner ring for unidirectional rotation with respect to the drive pulley in the direction of rotation of the pulley. This permits driving the belt by means of the studs and, consequently, to reduce the tensile stress in the useful part of the belt, which is friction driven by the pulley, and to prevent the belt from drifting on the pulley when it is slack. The belt can be reinforced by eyelets inserted into the holes and/or by means of a ribbon bonded or otherwise fastened to the belt edge.

Though it is possible to fit one pulley end only with the guiding means of the invention, it will be generally advantageous to equip both ends with the same.

BRIEF DESCRIPTION OF THE DRAWING

The above and other objects, advantages and features of the invention will become more apparent from the following detailed description of a now preferred embodiment thereof, taken in conjunction with the accompanying somewhat diagrammatic drawing wherein.

DETAILED DESCRIPTION OF PREFERRED EMBODIMENT

Figure 1:
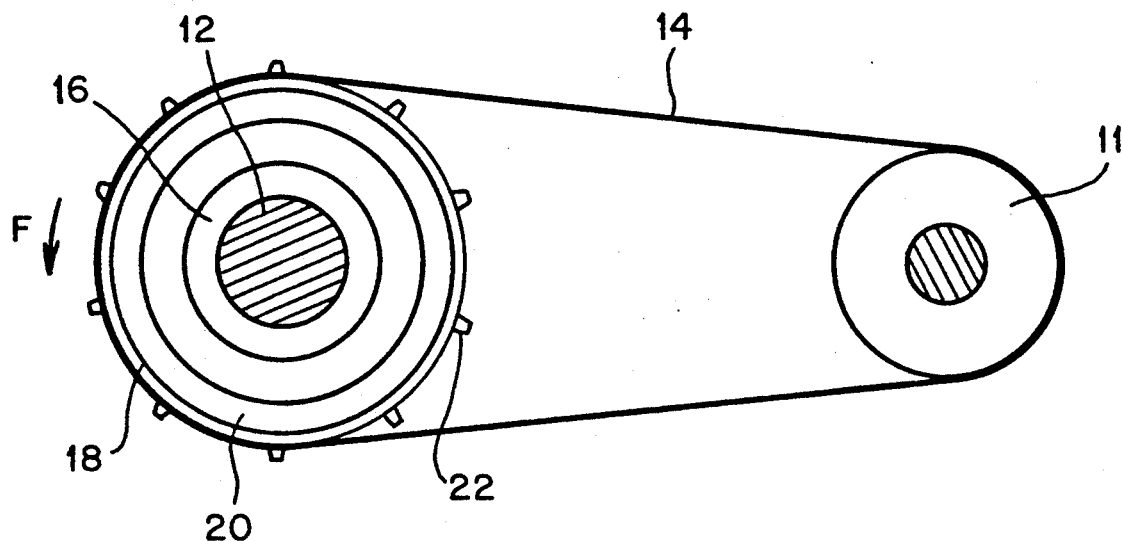
FIG. 1 is a side elevational view, partly in section, of an endless belt conveyor according to the present invention.

In the drawing, endless belt 14 is trained over drive pulley 10 and driven pulley 11. Shaft 12 of the drive pulley and the shaft of the driven pulley are shown in section in FIG. 1, the pulley shafts extending parallel to each other. Drive pulley shaft 12 is coupled to a gear motor (not shown) for rotating the shaft and pulley in the direction of arrow F.

Figure 3:
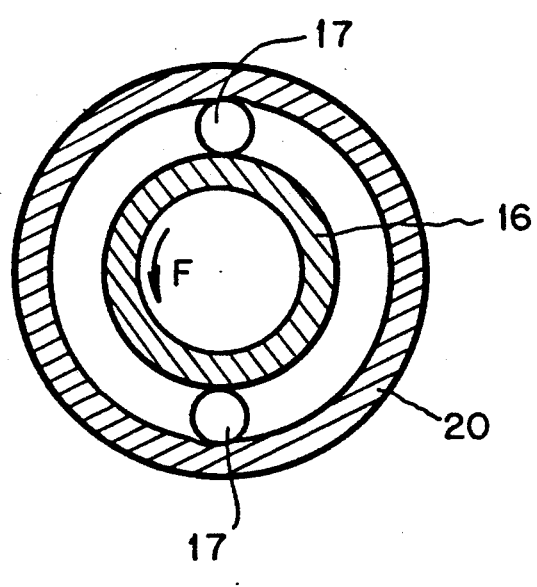
FIG. 3 is a transverse section of a roller-type freewheel.
Figure 2:
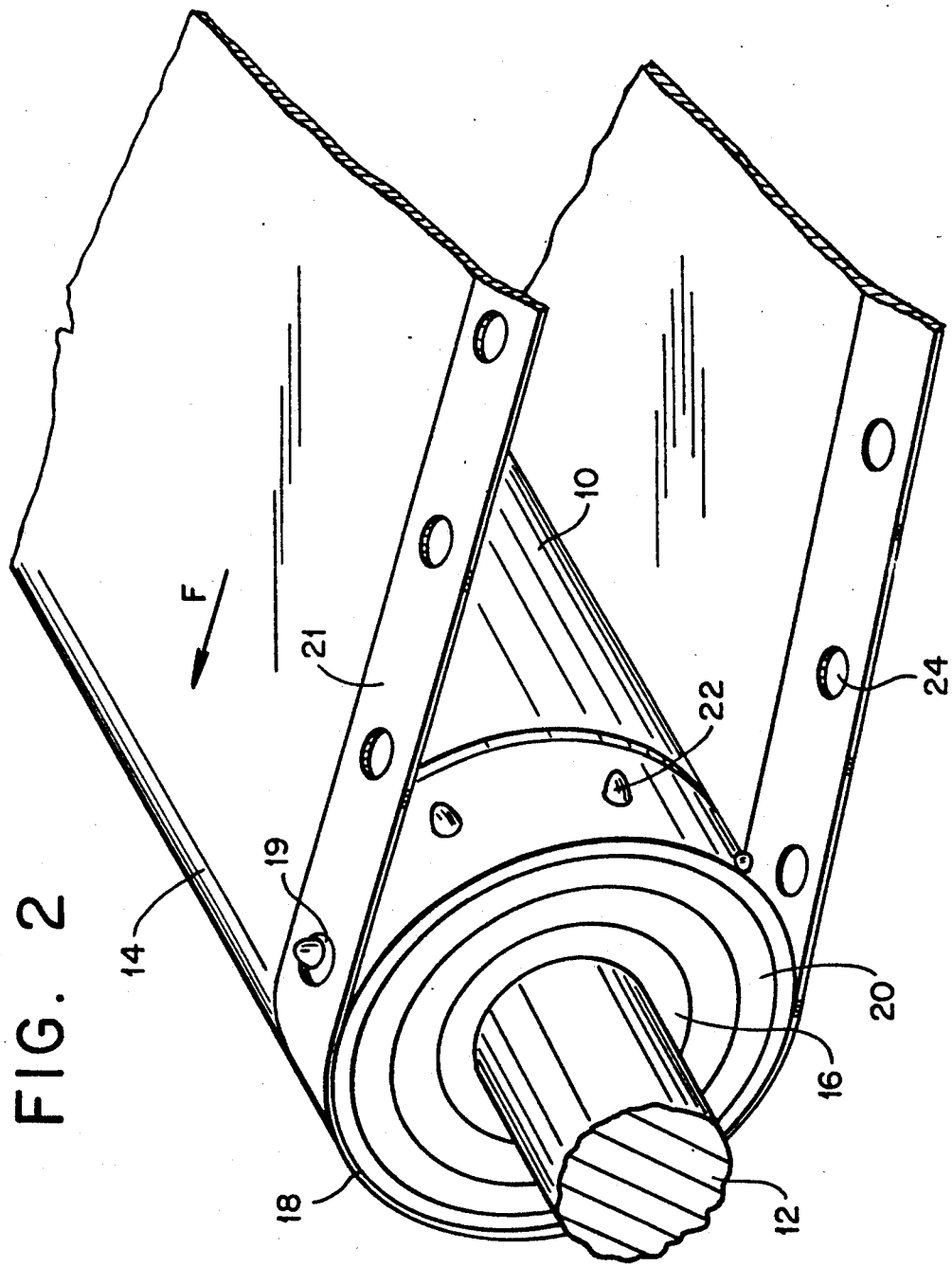
FIG. 2 is a fragmentary perspective view showing the drive pulley end of the conveyor.

Both ends of drive pulley 10 are equipped with identical belt guiding means one of which is shown clearly in FIG. 2. As shown at one end of the pulley, the belt guiding means includes a freewheel. The freewheel comprises inner ring 16, which is secured to pulley shaft 12, for instance by shrinking, to be rotated therewith, and outer ring 20. In the embodiment illustrated in FIG. 3, roller bearing 17 is interposed between the inner and outer rings of the freewheel. However, the freewheel may also be of the cam or pawl-and-ratchet type assuring unidirectional rotation of the outer ring of the freewheel with respect to the inner ring.

Hoop 18 is affixed to outer freewheel ring 20 and has affixed thereto, or is integral with, studs 22 equidistantly spaced from one another about the circumference of the hoop.

The freewheel makes the connection for a positive drive in the direction of arrow F between drive pulley shaft 12 and endless belt 14 through hoop 18 and studs 22 but permits outer ring 20 and hoop 18 to run, at a speed higher than that of pulley 10. Belt 14 is normally driven by pulley 10 by friction. However, when the belt has slacked and is liable to slide with respect to the pulley, it is driven by the freewheel. Studs 22 enter into holes 24 punched in the belt edge at a distance from each other equal to the distance between the studs. The relative rotation of outer ring 20 and hoop 18 with respect to pulley 10 is very small since it serves only to accomodate the differences in position of studs 22 and holes 24.

The outer diameter of hoop 18 is slightly smaller than that of the pulley. The studs have a frusto-conical or round-shaped tip. Holes can be reinforced by eyelets 19. It is also possible to reinforce the belt edge by means of a ribbon 21 fastened to the belt, for example by bonding.

Because of the manufacturing tolerances and of the distortions of the belt, the circumferential distance between the studs is never exactly equal to the distance between the holes in the belt edge. Consequently, after a certain time has elapsed, the clearance allowed for between the studs and the holes is totally absorbed, in either direction.

If the distance between the studs is smaller than the distance between the holes, when the studs enter into the holes, they will apply to the belt a circumferential stress in the direction of rotation which will cause non-detrimental folds in the belt edge. On the contrary, i.e. if the distance between the studs is higher than the distance between the holes, if the studs were integral with the pulley, they would subject the belt to a stress in the opposite direction to its movement which would tend to cause the belt to slip on the pulley. As the friction of the belt on the pulley opposes this slippage, the stresses applied might tear the belt off. The arrangement of the invention permits hoop 18, which bears the studs, to rotate forward with respect to the pulley and to the belt so that the studs enter easily into the belt holes; the fact that the outside diameter of hoop 18 is smaller than that of the pulley makes this rotation easier by reducing the frictions between the edge of the belt and the hoop.

When this conveyor is incorporated into a high intensity magnetic separator of the type described hereinabove, belt 14 is made of a synthetic material such as that known under the trademark "Teflon" (tetrafluoroethylene polymer) or the trademark "Kevlar"; it is approximately 0.12 to 0.13 mm thick.

The invention is of interest even for belts with a thickness of several tenths of a millimeter, insofar as there is a risk that the belt tears because of longitudinal stresses applied on its edges.

In the embodiment described above, the studs guide the belt and participate in driving it.

It must be understood that any modifications resulting from the substitution of equivalent technical means come within the scope of the invention as defined by the claims.

What is claimed is:
1. An endless belt conveyor comprising
 (a) two pulleys
  (1) one of which is a drive pulley having opposite ends and having a drive shaft arranged to rotate the pulley in a direction of rotation,
 (b) an endless belt trained over the pulleys, and
 (c) belt guiding means at at least one of the drive pulley ends, the belt guiding means comprising
  (1) a freewheel including an outer ring and an inner ring, the outer ring being mounted on the inner ring for unidirectional rotation in the direction of rotation of the drive pulley and the inner ring being fastened to the pulley shaft for rotation therewith, and
  (2) a circular row of studs affixed to the outer ring of the freewheel,
  (3) the belt having an edge aligned with the row of studs and defining a row of holes, the studs fitting into the holes.
2. The endless belt conveyor of claim 1, wherein the outer ring of the freewheel has a diameter smaller than that of the drive pulley.
3. The endless belt conveyor of claim 1, further comprising eyelets disposed in the holes.
4. The endless belt conveyor of claim 1, further comprising a reinforcing ribbon extending along the belt edge and fastened to the belt, the holes extending through the reinforcing ribbon.
5. The endless belt conveyor of claim 1, wherein the belt is composed of a synthetic resin material and has a thickness of the order of a few tenths of a millimeter.

* * * * *